United States Patent Office 3,208,269
Patented Sept. 28, 1965

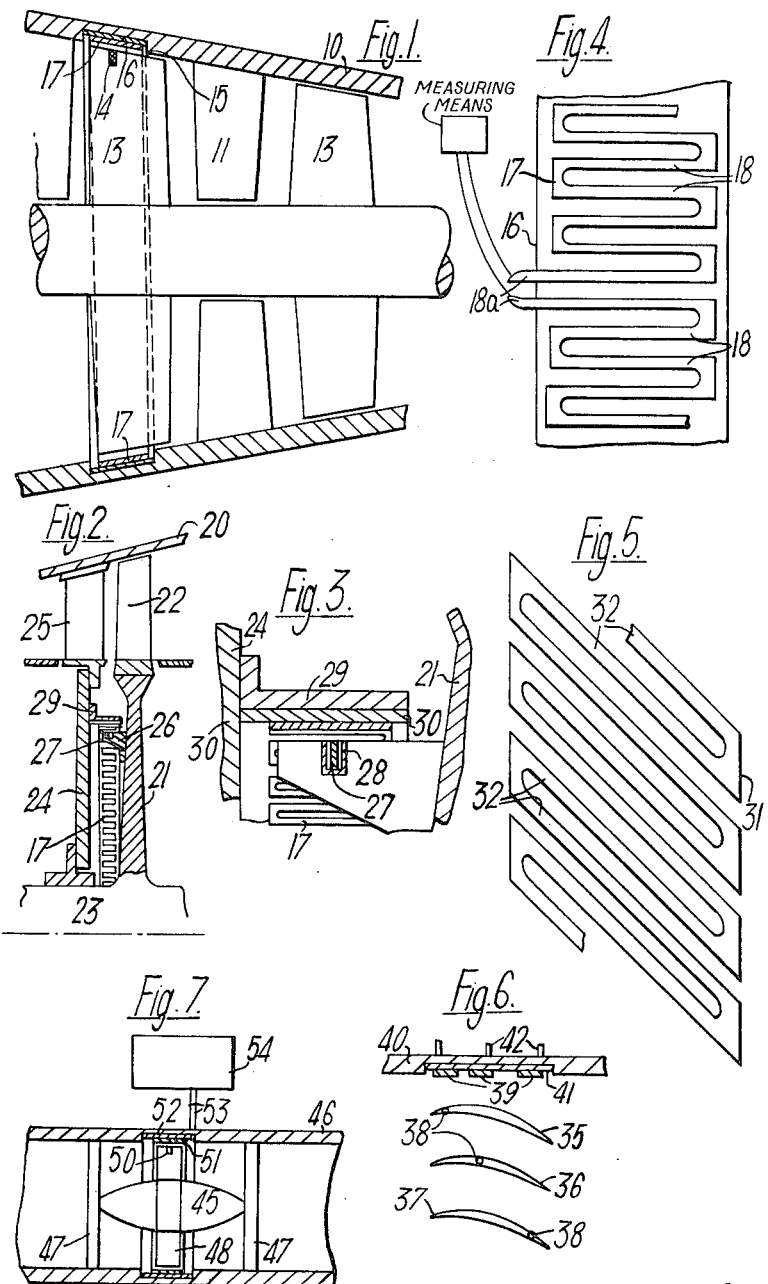

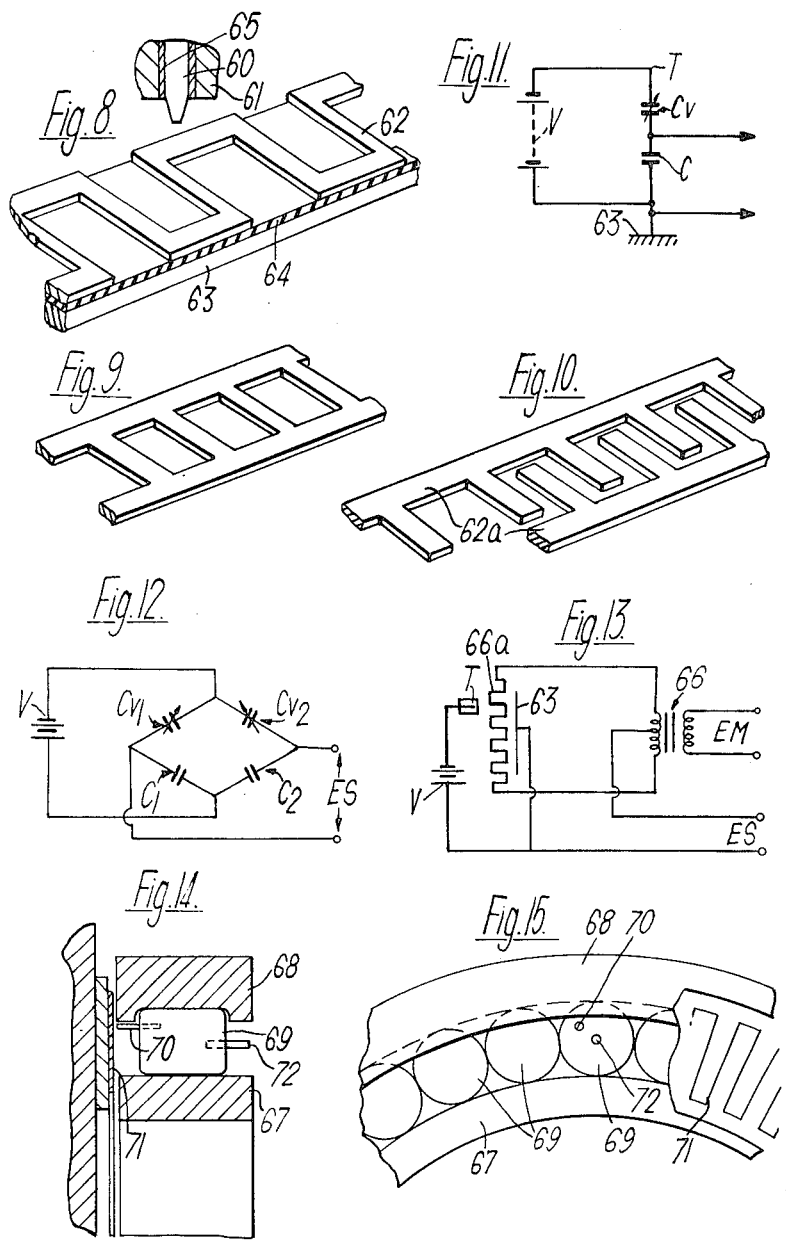

3,208,269
ELECTRO-MAGNETIC ROTATION MEASURING APPARATUS
Edward Stuart Eccles and Donald Glenfield Seymour, Filton, Bristol, England, assignors to Bristol Siddeley Engines Limited, Bristol, England, a British company
Filed Dec. 15, 1961, Ser. No. 159,651
13 Claims. (Cl. 73—71.4)

This invention has several applications. For example, it may be used to enable the general movement or the vibration of a moving member of a machine to be measured, or it may be embodied in a rotary fluid flow meter or in a frequency multiplier.

Apparatus according to the present invention comprises a movable member and a stationary member, one of these members carrying a magnet or electrostatic electrode and the other carrying a conductor comprising a row of regularly spaced, laterally extending bars (that is to say, bars extending laterally of the row) connected together and so arranged that during movement of the movable member the magnet or electrode crosses the bars successively, so that an alternating electrical signal can be obtained from the conductor, the signal being at a frequency proportional to the frequency with which the magnet or electrode crosses the bars of the conductor.

In the case of a magnet the conductor should be in a zig-zag form so that an E.M.F. is generated in the conductor by the flux from the magnet cutting across the conductors. In the case of an electrode the electrode should be connected electrically to means by which an E.M.F. can be applied across the gap between the electrode and the conductor, so that an electrical signal can be obtained owing to the varying capacitance between the electrode and the conductor.

This invention is particularly applicable to apparatus in which the movable member rotates with respect to the stationary member about an axis remote from the magnet or electrode, the row of bars being in the form of an annulus.

According to one application of the invention the magnet or electrode is carried by a part of the movable member which during use is liable to vibrate in a direction such as to cyclically increase and decrease the frequency with which the magnet or electrode will cross the bars of the conductor. In this case the electrical signal which can be obtained from the conductor is at a basic frequency determined by the speed of movement of the magnet or electrode past the bars of the conductor, this basic frequency being modulated by the effect of the vibration of the movable member. If this electrical signal is then demodulated, the resultant signal will give an indication of the variation in speed of the vibrating part of the movable member with respect to the remainder of the movable member. This gives an indication of the stress induced in the movable member through vibration.

This method of evaluating the stress induced in a vibrating part of a movable member is particularly applicable to the blades of an axial flow compressor or turbine, especially blades which are mounted as cantilever with unsupported free ends, for example with fir-tree root anchorages. In this case the electrical pickup (magnet or electrode) is mounted in the tip of one of the blades of the rotor, and is surrounded by the conductor. The stress at the root of a cantilever turbine blade is proportional to the product of the frequency of vibration and the amplitude of vibration of the tip of the blade. This product of tip amplitude and frequency is basically a function of the tip velocity for any given blade. This is true for a number of different modes of vibration. The present invention therefore provides a useful way of finding out the fatigue life of any given blade of a turbine or compressor at various speeds of rotation, a similar blade having been first tested to destruction on a static test rig employing artificially-induced vibrations, with a strain gauge to give an indication of the stress induced at the root of the blade.

If the movable member carries a magnet then the conductor is preferably in the form of a ploughwise zig-zag (that is to say a zig-zag shape in which the laterally extending parts, i.e. the bars, are all substantially parallel to one another). The conductor is discontinuous at one point along the path of the magnet so that an alternating E.M.F. will be generated across the break in the conductor during rotation of the movable member. The E.M.F. signal can be demodulated in order to determine the vibration of the tip of the rotor blade with respect to the remainder of the rotor.

In the case of an electrode being carried by the movable member, the electrode should be connected electrically to means by which an E.M.F. can be applied across the gap between the electrode and the conductor during rotation of the movable member. The gap between the electrode and the conductor can be used as a capacitive impedance forming part of a potential divider so that the voltage across a second impedance coupled in series with the capacitive impedance of the gap can be recorded in order to determine the frequency with which the electrode passes the bars of the conductor, and hence to determine the velocity with which the vibrating part of the movable member moves with respect to the remainder of the movable member. The means for forming a connection with the electrode may be a capacitive slip ring, that is to say an electrical connection formed by a ring mounted on the rotor and connected to the electrode, and a ring mounted on the stator and connected to the source of E.M.F., so that a substantially constant capacitive impedance is maintained between the two rings during rotation of the rotor.

In order to test vibration a compressor or turbine blade may be mounted on a non-rotary member which vibrates the blade artificially, and the conductor may be mounted on the outside surface of a member which can rotate in order to carry the bars of the conductor successively past the tip of the blade. The blade may in this case carry a magnet, and the E.M.F. induced in the conductor by the magnet may be taken off through a slip ring and one or more stationary electrical terminals to an electrical circuit including a demodulator as already described. Alternatively the blade may carry an electrode, in which case the conductor would be connected to a stationary electrical terminal by a slip ring.

An alternative way of testing vibration of a compressor or turbine blade is by mounting the blade and the conductor on co-axial members which are driven in opposite directions so that the relative speed of rotation between the two members is the sum of the individual speeds of rotation.

In the case of the present invention being applied to a fluid flow meter, the movable member is connected to or is part of a rotary member carrying blades on which the action of fluid during use with produce forces to rotate the movable member, the rate of fluid flow being calculable from the frequency of the electrical signal obtainable from the conductor.

In general in the case of the movable member carrying a magnet, apparatus according to this invention may be used to generate a high frequency E.M.F. If the movable member is driven by an A.C. motor then the apparatus is in the form of a frequency multiplier, the degree of multiplication of frequency depending on the ratio of the frequency of the input current to the number of bars of the conductor.

Examples of apparatus according to the present invention are shown in the accompanying drawings.

In these drawings:

FIGURE 1 is a sectional side elevation of part of an axial flow compressor showing a magnet mounted on one of the rotor blades and surrounded by an annular conductor;

FIGURE 2 is a sectional side elevation showing the upper half of part of an axial flow gas turbine with a magnet mounted on the turbine rotor disc and surrounded by an annular conductor;

FIGURE 3 is a section on an enlarged scale of the magnet and conductor shown in FIGURE 2;

FIGURES 4 and 5 are fragmentary views of two forms of ploughwise zig-zag conductor;

FIGURE 6 is a scheme showing the relationship of three magnets mounted on successive rotor blades of a compressor blade ring with three annular conductors;

FIGURE 7 is a sectional elevation of a rotary fluid flow meter and shows a magnet mounted on one of the metering blades and surrounded by an annular conductor;

FIGURE 8 is a fragmentary perspective view showing apparatus with an electrode and a zig-zag conductor;

FIGURES 9 and 10 show alternative conductors;

FIGURE 11 shows an electrical circuit for the apparatus of FIGURE 8;

FIGURE 12 shows an electrical circuit for the conductor shown in FIGURE 10;

FIGURE 13 shows an electrical circuit for apparatus such as that shown in FIGURE 8 including in addition a magnet;

FIGURE 14 is a fragmentary longitudinal section of a roller bearing embodying the invention; and FIGURE 15 is a view from the left of FIGURE 14.

Referring to FIGURE 1, the axial flow air compressor comprises a casing 10 supporting rings of stator blades 11 and enclosing a rotor provided with rings of rotor blades 13. It is desired to measure the vibration of one of the rotor blades, or more specifically, the component of displacement of the tip in a plane normal to the axis of rotation, and accordingly a permanent magnet 14 of elongated cylindrical shape is placed in a radial hole formed in the tip of the blade concerned and is retained therein by any suitable method such as peening or cementing. Where the rotor blade material is strongly magnetic the magnet 14 may be insulated by a sleeve of substantially non-magnetic material such as a ceramic so as to ensure a zone of sufficient magnetic flux adjacent the outer radial end of the magnet.

The internal surface of the casing 10 is machined to form an annular groove 15 which surrounds the blade carrying the magnet 14. Since the casing 10 is an electrically conducting material, an annular backing layer of insulating material 16 is first cemented into the groove 15 and then an annular conductor 17 of metal foil is laid or formed against the insulating layer 16. The conductor 17 comprises a multiplicity of parallel laterally extending bars 18 which are joined at their ends to provide a ploughwise zig-zag form as shown in FIGURE 4. The bars 18 in this embodiment extend axially in a direction substantially normal to the axis of the magnet 14 and, since they are spaced from the adjacent end of the magnet by only a small amount, e.g. 0.100 inch, substantially normal also to the magnetic lines of force.

The conductor is discontinuous between two adjacent bars 18a which are joined by leads passing radially through insulated passages in the casing 10 to a suitable electrical circuit outside the casing.

Consequently when the compressor is rotated, the magnetic field of the magnet 14 carried by the rotating blade 13 is intercepted successively by the equally spaced bars 18 and an alternating E.M.F. is generated across the bars 18a. Since the bars 18 are equally spaced in the direction of movement, a steady speed of rotation of the compressor will result in an E.M.F. of a steady frequency, such frequency being directly proportional to the speed of rotation. If the blade which carries the magnet suffers flexural vibration, a form of vibration which results in a large circumferential displacement of the end of the blade, then the frequency of the E.M.F. will increase and decrease cyclically, and after demodulation an indication of the stress induced by the vibration can be obtained.

In order to give an unambiguous result after demodulation of the E.M.F., the magnet should cross at least four bars of the conductor during each cycle of vibration. In one particular example the conductor has 720 bars 18 surrounding a bladed rotor running at 100 revolutions per second for measuring blade vibration up to 10 kcs.

The conductor 17 may be cemented as a continuous metal foil to the insulating backing 16 and subsequently machined or etched to shape, or may be sprayed on to the backing through a mask. Alternatively a ring of metal foil may be formed with punched laterally extending slots ending just short of the edges of the ring, only alternate slots being aligned, and the edges of the ring may be machined away so as to leave a zig-zag conductor after the ring has been cemented to the backing.

The bars of the conductor may be inclined to the axis of rotation of the rotor in order to increase the electrical signal which would be produced by blade vibrations including an axial component. The inclination of the bars to the axis of rotation is preferably in the same direction as the inclination of the root cross-section of the blade carrying the magnet.

In FIGURES 2 and 3, a gas turbine casing 20 encloses a rotor disc 21 with blades 22 which is mounted on a shaft 23. A diaphragm 24 located immediately upstream of the turbine disc supports the inner ends of hollow guide vanes 25. From a chosen location on the upstream face of the turbine disc a support 26 projects towards the diaphragm 24 and is provided with a radial recess which houses a cylindrical permanent magnet 27 and a steel cup 28 which surrounds with lateral clearance the magnet. The cup 28 acts to concentrate the magnetic lines of force of the magnet, and both parts may be retained in the radial recess by peening. On the downstream face of the diaphragm 24 is mounted an annular bracket 29 having on its inwardly facing surface an annular backing layer of insulating material 30 to which is attached an annular conductor 17 of ploughwise zig-zag form such as is shown in FIGURE 4. The conductor 17 is arranged to surround closely the locus of the magnet 27 so as to lie within the magnetic field of the magnet as the latter rotates with the turbine disc 21. Two adjacent bars of the conductor are connected to insulated leads (not shown) which pass through the bracket and radially outwards through one of the hollow guide vanes 25 and through the casing 20 to be connected to a circuit which includes frequency recording or indicating means.

When the rotor carrying the magnet 27 is rotated, the magnetic field of the magnet is intercepted in succession by each of the bars of the conductor and an E.M.F. is thus generated in the conductor, the frequency of which is directly proportional to the speed of rotation; the frequency can be recorded or indicated in the conductor circuit outside the turbine casing. Alternatively and preferably the conductor may be in the slanting ploughwise zig-zag form shown in FIGURE 5. In this case the parallel bars 32 of the conductor 31 are inclined at 45° to the axis of rotation. The reason for this is that the principal components of movement of the disc vibrations are in the axial sense, and the slanted bars will be effected in permitting variation of the pulse frequency due to such disc vibrations to be effectively sensed.

If desired the bracket 29 may be located closer to the axis of th rotor 23 and with the conductor 31 mounted around its outwardly facing surface and arranged to lie within the locus of the rotatable magnet 27 which is housed in an inwardly facing recess in its support.

To increase the sensitivity to vibrations having mainly axial components of movement, the apparatus may include a second conductor, lying within an insulator from the first-mentioned conductor, of which the bars 32 are inclined to the axis of rotation of the rotor in the sense opposite to that of the first-mentioned conductor. The angle of inclination between the bars of the two conductors may be 90°. The two conductors may be connected to separate circuits, and the outputs can be compared to enable the absolute direction of vibration to be determined.

FIGURE 6 shows an arrangement in which three successive rotor blades 35, 36, 37 of a blade ring forming part of an axial flow compressor are each provided with a permanent magnet 38 housed in a radial recess in the blade tip. One magnet is located adjacent the leading edge portion of the blade 35, one is located centrally of the blade 36, and one is located adjacent the trailing edge portion of the blade 37. Three axially spaced annular conductors 39 of ploughwise zig-zag form lie in an annular recess formed in the inner surface of the casing 40, each conductor closely surrounding the locus of one of the magnets 38. An insulator backing 41 is provided for the conductors and ach conductor is connected by a pair of leads 42 to the same electrical circuit or to separate circuits, as desired, which is or are provided with frequency recording or indicating means. This embodiment shows how simply vibration at several adjacent points may be sensed.

If several blades in the same ring of blades are required to be tested for vibration, magnetic material may be secured in several blades, to follow the same path during rotation of the rotor, and the blades may be tested one at a time by magnetising the magnetic material in each blade separately for each test. After each blade has been tested, the magnetic material in it would be de-magnetised.

It should be noted that in the case of the vibration of a movable member being tested according to the present invention by means of a magnet and a zig-zag conductor, there is no need for any slip rings or slip lines in order to make an electrical connection between a stationary member and a moving member.

In FIGURE 7 the invention is shown embodied in a rotary fluid flow meter. The meter comprises a housing 45 supported on the axis of a duct 46 by upstream and downwstream streamlined supports 47, and a plurality of radial blades 48 which are mounted on a rotor supported in bearings within the housing 45 and are rotated by the fluid flow in the duct 46. One of the blades 48 is provided with a magnet 50 housed in a radial recess formed in the blade tip portion, and a continuous groove in the wall of the duct. 46 contains an annular conductor 51 of ploughwise zig-zag form which closely surrounds the locus of the magnet 50 and is provided with an insulator backing 52. The conductor is connected by leads 53 to a circuit 54 containing frequency recording or indicating means.

In this embodiment the frequency of the E.M.F. induced in the conductor circuit is directly dependent on the speed of the rotation of the blade-mounted magnet, which in turn depends on the rate of flow in the duct 46.

FIGURE 8 shows an electrostatic electrode 60 mounted in the tip of a blade 61. The electrode moves along a conductor 62 which has a ploughwise zig-zag form, the conductor being mounted in a case 63 with an interposed insulating layer 64. The conductor and case are shown diagrammatically in a flat developed form for the sake of clarity.

The electrode 60 is insulated from the blade tip by insulating material 65 and is connected to a stationary electrical terminal by means of a capacitive slip ring (not shown). The terminal is represented by the point T in FIGURE 11, and the capacitance between the electrode 60 and the conductor 62 is shown as $C\nu$. The capacitance $C\nu$ forms a potential divider together with a capacitance C between the grid and the case 63, and a source of E.M.F. V is connected across both capacitances. The voltage drop across the capacitance C is dealt with in the same way as the E.M.F. generated by the magnet in the conductor in the examples already described. In other words, the signal derived from the capacitance C is demodulated in order to obtain a measure of the velocity of the electrode 60 with respect to the remainder of the rotor owing to vibration. The circuit thus constitutes a frequency measuring means.

FIGURES 9 and 10 show alternative conductors which can be used with the electrostatic electrode 60. The conductor shown in FIGURE 10 is formed by two separate comb-shaped parts 62a; the output signal is taken between the two parts of the conductor, as shown in FIGURE 12, in which $C\nu 1$ and $C\nu 2$ represent the capacitances between the electrode and the two parts of the conductor, C1 and C2 represent the capacitances between the two parts of the conductor and the casing, and E.S. shows the signal taken between the two parts of the conductor.

In the case of a zig-zag conductor an electrode may be used in combination with a magnet fitted in a different blade so as to move along substantially the same path as the electrode. The electrical circuit in this case is shown in FIGURE 13. The conductor in this case is discontinuous at one point and the E.M.F. across the break in the conductor is taken off as a signal E.M. via a transformer 66. The conductor is represented by the zig-zag line 66a. A signal E.S. derived from the electrode is taken across the casing 63 and a centre-tap in the primary winding of the transformer.

The electrode is connected electrically to a terminal T as before.

Several blades may be fitted with electrodes moving along the same conductor. In this case the E.M.F. connected across the potential divider for each blade would be at a high frequency (many times higher than the carrier frequency produced by the movement of the electrode past the laterally extending parts of the conductor), each blade having a different high frequency and a different capacitive slip ring connection to a stationary terminal. The signal from each blade can then be demodulated to obtain a signal dependent only on the frequency with which the electrode passes the bars of the conductor 62, and further demodulation would give an indication of the velocity of the electrode with respect to the remainder of the rotor. A high frequency E.M.F., may also be used in the case of only one blade being fitted with an electrode.

FIGURES 13 and 14 show an arrangement whereby the speed of rotation of a roller in a roller bearing about the axis of the bearing and about its own axis can be determined. The roller bearing is formed by an inner ring 67 and an outer ring 68 with rollers 69. One of the rollers is fitted at one end with a magnet 70 in a position remote from the axis of the roller. A conductor 71 in a zig-zag form lies in a plane normal to the axis of the bearing with the laterally extending parts of the conductor lying radially (the conductor is shown broken away in FIGURE 14 for the sake of clarity). The conductor is discontinuous at one point so that an alternating E.M.F. is generated across the break in the conductor. This E.M.F. will have two components, one at a frequency equal to the speed of rotation of the roller about the axis of the bearing, and the other at a frequency determined by the speed of rotation of the roller about its own axis. Both of these speeds of rotation could be calculated from the signal taken across the break in the conductor 71, but in order to facilitate this calculation the roller is fitted with a second magnet 72 which is secured to the end remote from the magnet 70 and which lies on the axis of the roller. A second conductor (not shown) which is similar to the conductor 71 is fitted to the casing of the bearing in a position adjacent to the magnet 72. The signal from this second conductor gives an indication of the speed of rotation of the roller about the axis of the bearing, and it can be used to demodulate the signal taken from the conductor 71 so that the resultant will depend only upon the speed of rotation of the roller about its own axis.

In the case of a roller bearing with a cage, the speed of rotation of the cage can be determined by securing a magnet to the cage.

Apparatus according to this invention may, in the case of the movable member carrying a magnet, include a thin metal cover which is cemented over, and insulated from, the conductor, in order to prevent the conductor from being damaged by foreign bodies, for example ice particles. The cover may, for example, be of stainless steel. Although it lies between the conductor and the magnet, if the cover is about 0.01 inch thick it will not have any appreciable detrimental effect on the electrical signal obtainable from the conductor.

We claim:

1. Apparatus comprising a rotary device mounted for rotation with respect to a stationary support member, the said rotary device including a part which is liable to reciprocate with respect to the remainder of the rotary device during rotation of the rotary device, and means for measuring the frequency of reciprocation of the said reciprocating part of the rotary device, said measuring means comprising signal generating means including a first part mounted on the reciprocating part of the rotary device and a second part comprising an electrical conductor mounted on the stationary support member and formed by a plurality of regularly spaced but interconnected mutually parallel bar elements forming an annulus co-axial with the rotary device, the bars being so positioned on the support member that rotation of the rotary device carries the first part across each of the bar elements in turn when no reciprocation of the reciprocating part is occurring, whereby a carrier electrical signal is given by the conductor at a fixed frequency when no reciprocation of the reciprocating part is occurring, the said carrier signal during actual reciprocation of the reciprocating part being modified, which modification is indicative of the frequency and velocity of reciprocation of the reciprocating part with respect to the remainder of the rotary device.

2. Apparatus according to claim 1 in which the first part is a magnet and in which the conductor is in a ploughwise zig-zag form and is discontinuous at one point along its circumference and the measuring means are connected on either side of such point so that an alternating E.M.F. generated across the discontinuity in the conductor during rotation of the rotary device can be measured.

3. Apparatus according to claim 1 in which the rotary device is the bladed rotor of an axial flow fluid motion machine, the first part being mounted in the tip of one of the blades of the rotor.

4. Apparatus according to claim 1 including a second conductor, similar to and axially spaced from the first-mentioned conductor, and a third part which moves along a path crossing the bars of the second conductor.

5. Apparatus according to claim 1 in which the bars of the conductor are inclined to the axis of rotation of the rotary device.

6. Apparatus comprising a rotary device mounted for rotation with respect to a stationary support member, the said rotary device including a part which is liable to reciprocate with respect to the remainder of the rotary device during rotation of the rotary device, and means for measuring the frequency of reciprocation of the said reciprocating part of the rotary device, said measuring means comprising signal generating means including a first part mounted on the reciprocating part of the rotary device and a second part comprising an electrical conductor mounted on the stationary support member and formed by a plurality of regularly spaced but interconnected mutually parallel bar elements forming an annulus co-axial with the rotary device, the bars being so positioned on the support member that rotation of the rotary device carries the first part across each of the bar elements in turn when no reciprocation of the reciprocating part is occurring, whereby a carrier electrical signal is given by the conductor at a frequency directly proportional to the speed of rotation when no reciprocation of the said part is occurring, the frequency of the said carrier signal during said reciprocation being modulated such that the modulation depth is directly proportional to the velocity of reciprocation while the modulation frequency is identical with the frequency of reciprocation.

7. An axial flow power conversion machine including a rotor mounted for rotation in a stationary support member, the rotor having radially extending blades which, in cross-section, are inclined to the axis of rotation of the rotor, whereby the blades are liable to vibrate in directions inclined to the said axis of rotation, and means for measuring the vibration of one of the said blades, said measuring means comprising signal generating means comprising a first part mounted in the tip of the said one blade and a second part comprising an electrical conductor mounted in the stationary support member and formed by a plurality of regularly spaced but interconnected mutually parallel bar elements forming an annulus which is co-axial with the rotor and surrounds the said one blade, the bars being so positioned that rotation of the rotor carries the first part across each of the bar elements in turn when no reciprocation of the said one blade is occurring, whereby a carrier electrical signal is given by the conductor at a fixed frequency dependent upon the speed of rotation of the rotor, the said carrier signal during vibration of the said one blade being modulated, which modulation is indicative of the frequency and velocity of vibration of the said one blade.

8. An axial flow power conversion machine including a rotor mounted for rotation in a stationary support member, the rotor having radially extending blades which, in cross-section, are inclined to the axis of rotation of the rotor, whereby the blades are liable to vibrate in directions inclined to the said axis of rotation, and means for measuring the vibration of one of the said blades, said measuring means comprising a magnet mounted in the tip of the said one blade, and an electrical conductor mounted in the stationary support member and formed by a large number of regularly spaced but interconnected mutually parallel bar elements connected alternately at opposite ends to form a zig-zag and forming an annulus which is co-axial with the rotor and surrounds the said one blade, the bars being so positioned that rotation of the rotor carries the magnet on the said one blade across each of the bar elements in turn when no reciprocation of the said one blade is occurring, whereby the magnet generates in the conductor a high frequency carrier electrical signal when no vibration of the said one blade is occurring, the frequency of the said carrier signal during actual vibration of the said one blade being modulated to a depth proportional to the velocity of vibration of the tip of the said one blade, the frequency of modulation being equal to the frequency of vibration of the said one blade and being a small fraction of the frequency of the carrier electrical signal.

9. In apparatus according to claim 8, the number of bar elements being such that the first part crosses at least four bar elements during each cycle of vibration of the reciprocating part.

10. Apparatus comprising a roller bearing having a cage member mounted for rotation with respect to a stationary support and at least one roller member retained by and mounted to rotate with respect to said cage member, and means for measuring the speed of rotation of one of said members about an axis, said measuring means comprising signal generating means including a first part carried by one of said members at a point offset from such axis for rotation with said member about such axis and a second part comprising an electrical conductor mounted on the stationary support member and formed by a plurality of regularly spaced but interconnected mutually parallel bar elements forming an annulus co-axial with the cage member, the bars being so positioned on the support member that rotation of the members carries the first part across each of the bar elements in turn, whereby an electrical signal is given by the conductor.

11. Apparatus according to claim 10 in which the first movable part is carried by a roller member and is a magnet secured to one end of the roller member in a position remote from the axis of the roller member, the conductor being in a ploughwise zig-zag form lying in a plane normal to the axis of the bearing with the bars of the conductor lying radially, the conductor being discontinuous at one point, so that an alternating E.M.F. will be generated across the break in the conductor during rotation of the bearing.

12. Apparatus comprising a rotary device mounted for rotation with respect to a stationary support member, the said rotary device including a part which is liable to reciprocate with respect to the remainder of the rotary device during rotation of the rotary device, and means for measuring the frequency of reciprocation of the said reciprocating part of the rotary device, said measuring means comprising signal modifying means including a first part mounted on the reciprocating part of the rotary device, means to supply current to said first part, and a second part comprising an electrical conductor mounted on the stationary support member and formed by a plurality of regularly spaced but interconnected mutually parallel bar elements forming an annulus co-axial with the rotary device, the bars being so positioned on the support member that rotation of the rotary device carries the first part across each of the bar elements in turn when no reciprocation of the reciprocating part is occurring, whereby a carrier electrical signal is given by the conductor at a fixed frequency when no reciprocation of the reciprocating part is occurring, the said carrier signal during actual reciprocation of the reciprocating part being modified, which modification is indicative of the frequency and velocity of reciprocation of the reciprocating part with respect to the remainder of the rotary device.

13. An axial flow power conversion machine including a rotor mounted for rotation in a stationary support member, the rotor having radially extending blades which, in cross-section, are inclined to the axis of rotation of the rotor, whereby the blades are liable to vibrate in directions inclined to the said axis of rotation, and means for measuring the vibration of some of the said blades, said measuring means comprising signal modifying means comprising first parts mounted in the tips of some of the said blades and a second part comprising an electrical conductor mounted in the stationary support member and formed by a large number of regularly spaced but interconnected mutually parallel bar elements forming an annulus which is co-axial with the rotor and surrounds the said blades, and separate means for supplying current to each of said first parts, the bars being so positioned that rotation of the rotor carries the first parts on the said blades across each of the bar elements in turn when no reciprocation of the said blades is occurring, whereby a high frequency carrier electrical signal is given by the conductor at a frequency proportional to the speed of rotation of the rotor when no vibration of the said blades is occurring, the said carrier signal during actual vibration of the said blades being modified, which modification is indicative of the frequency and velocity of reciprocation of the blades.

References Cited by the Examiner

UNITED STATES PATENTS

| 1,623,648 | 4/27 | Wolf | 310—156 |
| 2,270,141 | 1/42 | Potter | 73—231 |
| 2,436,683 | 2/48 | Wood | 73—231 |
| 2,575,710 | 11/51 | Hardigg | 73—71.4 |
| 2,805,677 | 9/57 | Baird | 73—462 |

FOREIGN PATENTS 803,069   10/58   Great Britain.

OTHER REFERENCES

Pages 1 and 2, text-book "Alternating Curernt Circuits" 3rd edition, by Kerchner and Corcoran, published by Wiley in 1951.

RICHARD C. QUEISSER, *Primary Examiner.*

ROBERT L. EVANS, *Examiner.*